UNITED STATES PATENT OFFICE.

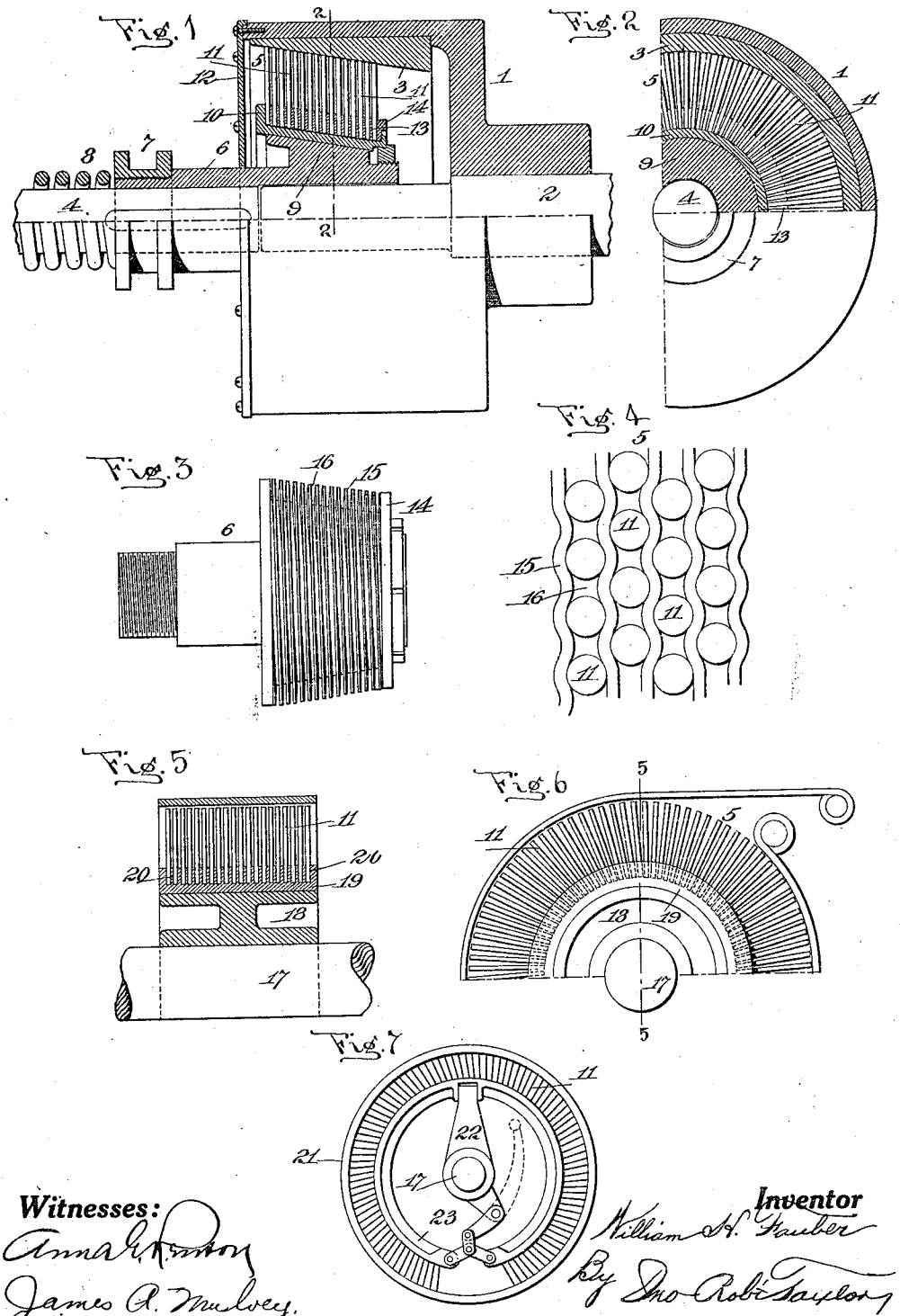

WILLIAM H. FAUBER, OF BROOKLYN, NEW YORK, ASSIGNOR OF ONE-HALF TO JOHN ROBERT TAYLOR, OF BROOKLYN, NEW YORK.

FRICTION DEVICE.

1,271,878.   Specification of Letters Patent.   Patented July 9, 1918.

Application filed March 4, 1915. Serial No. 11,980.

*To all whom it may concern:*

Be it known that I, WILLIAM H. FAUBER, a citizen of the United States, residing in the borough of Brooklyn, county of Kings, city and State of New York, have invented a certain new and useful Improvement in Friction Devices, of which the following is a specification.

My invention relates to friction devices and more particularly to clutches and brakes in which friction surfaces are brought together until both have the same degrees of rotation, in the case of clutches, or are brought to rest, as in the case of brakes, or in which the parts are caused to be engaged to produce the desired degree of slippage.

In metal-to-metal clutches and brakes, as usually employed, there is a tendency of the surfaces to stick together, suddenly let go, and grip again in rapid succession, thereby causing chattering and a jerky action. The friction members of such clutches and brakes engage each other under more or less pressure and consequently the pressure is unevenly distributed, the contact surfaces become roughened and the action of the device is defective. This is due to imperfections in material, workmanship or design, or in carelessness in operation.

Leather faced clutches and brakes have been employed to overcome the defects of the all metal devices but they are not entirely satisfactory owing to the care required in handling to prevent burning of the leather and to the attention required to keep them in order.

The objects of my invention are:

First: To provide a device in which one of the friction members will have a yielding surface which will conform to, and distribute the pressure evenly over the entire surface of the other friction member.

Second: To provide a device of the character described in which one of the friction surfaces is composed of numerous small engaging areas so that each operates independently and not with a rigid and unyielding action.

Third: To produce a friction member so constructed that minute particles of material loosened by attrition will be removed from the friction area before they become fused by the heat of the friction and mar the surfaces by scratching them.

Fourth: To produce a friction member so designed and constructed as to provide for the rapid carrying off of the heat generated by friction and adapted to prevent the localization of heat action on the friction surface.

Fifth: To provide a device of the character described which will not grip or chatter, which will have a free, even torque, which will have smooth action and will require the minimum amount of care and skill in manipulation.

These and further objects will more fully appear from an examination of the following specification and accompanying drawings, considered together or separately.

I have illustrated my invention in the following drawings in which like reference characters designate corresponding parts in all the figures, and in which:

Figure 1 is a half-longitudinal section and half-side elevation of a clutch embodying my invention;

Fig. 2 is a half-transverse section and half-end elevation of the same, the section being taken on the line 2—2 of Fig. 1;

Fig. 3 is a side elevation of the movable parts of the clutch with the friction surfaces removed;

Fig. 4 is a diagrammatic view of the preferred means of securing the friction elements of the movable portion of the clutch in position;

Fig. 5 is a half-longitudinal section of my improvements applied to a band brake, the section being taken on the line 5—5 of Fig. 6;

Fig. 6 is an end elevation of the device shown in Fig. 5; and

Fig. 7 is a side elevation showing my invention applied to an internal expansion brake.

In the drawings, 1 designates an annular friction member which is rigidly secured to a shaft 2. In the embodiment of the invention shown in Figs. 1 and 2 this shaft is the crank shaft of an automobile motor. In the usual automobile practice the member 1 forms part of the balance wheel of the motor. The member 1 carries on its bore a continuous, unbroken, conical friction surface 3.

Arranged in axial alinement with the shaft 2 is a shaft 4 which, in the embodiment shown, is the propeller shaft of an automobile, and mounted on the shaft 4 so as to rotate therewith and be movable axially thereon is an inner friction member 5 carried on a sleeve 6. This sleeve extends over a portion of the shaft 2 and forms a bearing therefor. The sleeve 6 carries a grooved collar 7 by means of which the sleeve may be moved in one direction and is engaged by a spring 8 to move it in the other direction as is the usual automobile practice. The sleeve 6 is provided with a hub 9 which carries on its periphery a channel 10 which carries a plurality of radially projecting, evenly spaced, filamentous members 11. The members 11 may be of bronze, brass, steel, fiber or any other suitable material and their outer ends may be ground or finished to such shape that the member 5 as a whole will conform to the shape of the friction surface 3 and will engage such surface at an acute angle when the member 5 is moved inward by the spring 8. The member 1 is closed by a plate 12 so as to prevent the entrance of dust, etc., and to prevent the escape of a lubricant when such is employed.

The members 11 are mounted on the surface of the channel 10 and set at right angles to the axis on which the parts revolve. The members 11 are set up in rows the first row resting against the front wall of the channel and the rows are separated and held apart in any desired manner. In Fig. 1 the rows of members are separated by means of flat rings 13 and the members and rings are held in place by means of a collar 14 rigidly secured to the end of the channel. In Figs. 5 and 6 the members 11 rest in perforations drilled in place.

I prefer, however, to secure the members 11 in place in the manner shown in Figs. 3 and 4. A continuous band 15 of soft copper or brass is secured at one end to the front wall of the channel 10 and is then wound spirally around the body of the channel so as to leave a spiral groove 16. The rear end of the strip is secured to the collar 14, the members 11 are inserted in proper spaced relation to each other in the groove, and the collar is forced on the end of the channel so that the ribbon will be crimped between the members 11 and retain them securely in position.

In Figs. 5 and 6 I have shown my invention applied to a band brake. In these figures, 17 represents the axle of a vehicle which carries thereon a hub 18 and rigidly secured to the hub is a cylinder 19 which forms a part of the hub and is provided with a plurality of circular series of tangentially arranged sockets 20. In each socket is carried a filamentous member 11 the outer end of which extends to the same distance from the cylinder 19 as all of the other members and the ends are ground arc shaped so that the members when assembled will present a true cylinder.

The outer ends of the members are surrounded and may be engaged by a band of flexible material carried on a stationary part of the vehicle such as the frame.

It will be understood that the members 11 instead of being carried on the hub may be carried by the band and their inner ends be brought into contact with the smooth periphery of the hub.

In Fig. 7 my invention is shown as applied to an internal expansion brake. In the figure, 21 represents the rotating brake drum which is usually carried on the wheel hub. Mounted on the axle 17 is an arm 22 which supports an elastic band 23, the periphery of which carries a plurality of members 11. The ends of the band 23 are secured together by a toggle joint and means are provided for forcing the ends apart and causing engagement of the members 11 with the interior wall of the drum 21.

I have shown the filamentous members 11 as being composed of short lengths of round wire but it will be understood that I do not limit myself to wires of such shape, but wires of any other cross sections may be employed.

In devices operating in both directions the radial arrangement of the members 11 shown in Figs. 1 and 2 is probably the most desirable but in devices running in one direction only it may be desirable to arrange the members on a tangent in front of the axis of rotation as shown in Figs. 6 and 7.

The members 11 being made of wire of small diameter it is obvious that there is a certain amount of flexibility as the members are forced into engagement with the surface of the other friction member and because of this flexibility the pressure on the members will be evenly distributed over the whole number of members and the resistance to relative rotation of the friction members will be effected by a great number of small units so that each operates independently and the members will engage each other evenly and surely and not with the rigid and unyielding action of two continuous unbroken surfaces.

The small contacting surfaces of the members 11 and their attenuated form will facilitate the radiation of heat generated by friction and the spaces between the members will permit particles worn off by attrition to fall from the friction surfaces before they become fused by the heat and before they can be dragged around on the friction surfaces and scratch and roughen the latter.

The spaces between the members may be filled with grease or oil if desired.

The operation of my improved friction device will be obvious from the above description.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. In a device of the character described, a friction member comprising a hub, a peripheral channel on the hub, a plurality of series of radiating elements resting in the channel, and a separating body between the different series of elements.

2. In a device of the character described, a friction member comprising a hub, spaced bodies surrounding the hub, and a series of radiating elements between the bodies.

3. In a device of the character described, a friction member comprising a hub, a series of spaced bodies surrounding the hub, and a series of radiating elements in the spaces between the bodies.

4. In a device of the character described, a friction member comprising a hub, a series of spaced bodies on the hub, a series of radiating elements between the bodies, and means for securing the bodies to the hub.

5. In a device of the character described, a friction member comprising a hub, a series of spaced bodies on the hub, a series of radiating elements between the bodies, and means for securing the bodies and elements to the hub.

6. In a device of the character described, a friction member comprising a hub, a series of spaced bodies on the hub, a series of radiating elements between the bodies, said bodies separating the elements of the series from each other.

7. In a device of the character described, a friction member comprising a hub, a peripheral channel on the hub, a plurality of series of radiating elements resting in the channel, a separating body between the different series of elements, and means for securing the elements in the channel.

8. In a device of the character described, a friction member comprising a hub, a peripheral channel on the hub, a plurality of series of radiating elements resting in the channel, a separating body between the different series of elements, and means for securing the elements and bodies in the channel.

9. In a device of the character described, a friction member comprising a hub, there being a spiral groove on the periphery of the hub, and a series of radiating elements seated in the groove.

10. In a device of the character described, a friction member comprising a hub, there being a spiral groove on the periphery of the hub, and a series of equally spaced radiating elements seated in the groove.

11. In a device of the character described, a friction member comprising a hub, a ribbon disposed around the periphery of the hub in such a manner as to form a spiral groove between its convolutions, and a series of radiating elements seated in the groove.

12. In a device of the character described, a friction member comprising a hub, a ribbon disposed around the periphery of the hub in such a manner as to form a spiral groove between its convolutions, and a series of equally spaced radiating elements seated in the groove.

13. In a device of the character described, a friction member comprising a hub, a ribbon disposed around the periphery of the hub in such a manner as to form a spiral groove between its convolutions, a series of equally spaced radiating elements seated in the groove, and means for securing the elements in spaced relation.

14. In a device of the character described, a friction member comprising a hub, a ribbon disposed around the periphery of the hub in such a manner as to form a spiral groove between is convolutions, a series of equally spaced radiating elements seated in the groove, and distortions in the ribbon for securing the elements in spaced relation.

15. In a device of the character described, a friction member comprising a hub, a ribbon disposed around the periphery of the hub in such a manner as to form a spiral groove between its convolutions, a series of equally spaced radiating elements seated in the groove, and means for securing the ribbon to the hub.

16. In a device of the character described, a friction member comprising a hub, a ribbon disposed around the periphery of the hub in such a manner as to form a spiral groove between its convolutions, and a series of radiating elements seated in the groove, crimps in the ribbon between the elements to retain them in position.

17. In a device of the character described, a friction member comprising a hub, a ribbon disposed around the periphery of the hub in such a manner as to form a spiral groove between its convolutions, and a series of equally spaced radiating elements seated in the groove, crimps in the ribbon between the elements to retain them in position.

18. In a device of the character described, a friction member comprising a hub, a ribbon disposed around the periphery of the hub in such a manner as to form a spiral groove between its convolutions, and a series of elongated radiating elements seated in the groove.

19. In a device of the character described, a friction member comprising a hub, a ribbon disposed around the periphery of the hub in such a manner as to form a spiral groove between its convolutions, and a series of elongated, equally spaced radiating elements seated in the groove.

20. In a device of the character described, a friction member comprising a hub, a ribbon disposed around the periphery of the hub in such a manner as to form a spiral groove between its convolutions, and a series of radiating elements of equal length seated in the groove.

21. In a device of the character described, a friction member comprising a hub, a ribbon disposed around the periphery of the hub in such a manner as to form a spiral groove between its convolutions, and a series of equally spaced radiating elements of equal length seated in the groove.

22. In a device of the character described, a friction member comprising a hub, a ribbon disposed around the periphery of the hub in such a manner as to form a spiral groove between its convolutions, and a series of elongated radiating elements of equal length seated in the groove.

23. In a device of the character described, a friction member comprising a hub, a ribbon disposed around the periphery of the hub in such a manner as to form a spiral groove between its convolutions, and a series of elongated, equally spaced radiating elements of equal length seated in the groove.

24. In a device of the character described, a friction member comprising a conical hub, a series of spaced bodies on the hub, a series of radiating elements disposed between the bodies, said elements and bodies being arranged perpendicular to the axis of the hub, a continuous, conical friction surface, and means for engaging the extremities of the elements with the surface.

25. In a device of the character described, a friction member comprising a hub, a series of spaced bodies on the hub, a series of filamentous elements arranged radially of the hub and between the bodies, and means for securing the bodies and elements to the hub.

26. In a device of the character described, a friction member comprising a hub, a series of spaced bodies on the hub, a series of relatively long filamentous elements arranged radially of the hub and between the bodies, and means for securing the bodies and elements to the hub.

27. In a device of the character described, a friction member comprising a hub, a series of spaced bodies on the hub, a series of separated filamentous elements arranged radially of the hub and between the bodies, and means for securing the bodies and elements to the hub.

28. In a device of the character described, a friction member comprising a hub, a series of spaced bodies on the hub, a series of separated relatively long filamentous elements arranged radially of the hub, and between the collars, and means for securing the bodies and elements to the hub.

29. In a device of the character described, a friction member comprising a hub, a series of spaced bodies on the hub, a series of filamentous elements substantially radially arranged between the bodies, and means for securing the bodies and elements to the hub.

This specification signed and witnessed this second day of March, 1915.

WILLIAM H. FAUBER.

Witnesses:
ANNA G. RENTON,
JNO. ROB'T TAYLOR.

Copies of this patent may be obtained for five cents each, by addressing the "Commissioner of Patents, Washington, D. C."